United States Patent
Pia

(10) Patent No.: US 11,936,830 B2
(45) Date of Patent: Mar. 19, 2024

(54) COMPUTER IMPLEMENTED METHOD FOR EMBEDDING A MARKER IN AN IMAGE OR VIDEO CONTENT AND CORRESPONDING MARKER DETECTION METHOD

(71) Applicant: DASSAULT SYSTEMES, Vélizy-Villacoublay (FR)

(72) Inventor: Maxime Pia, Vélizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 0 days.

(21) Appl. No.: 17/972,322

(22) Filed: Oct. 24, 2022

(65) Prior Publication Data

US 2023/0132234 A1 Apr. 27, 2023

(30) Foreign Application Priority Data

Oct. 25, 2021 (EP) .................................. 21306480

(51) Int. Cl.
*H04N 1/32* (2006.01)
*G06T 1/00* (2006.01)

(52) U.S. Cl.
CPC ....... *H04N 1/32309* (2013.01); *G06T 1/0092* (2013.01); *H04N 1/3232* (2013.01)

(58) Field of Classification Search
CPC ............. H04N 1/32309; H04N 1/3232; H04N 19/467; G06T 1/0092
See application file for complete search history.

(56) References Cited

U.S. PATENT DOCUMENTS 9,959,586 B1   5/2018 Yu et al.
11,082,710 B2  8/2021 Hoarty et al.
(Continued)

OTHER PUBLICATIONS

Extended European Search Report dated May 24, 2022 in European Patent Application No. 21306480.1 filed Oct. 25, 2021, citing document Nos. 1-4 and 24-25 therein, 12 pages.

(Continued)

*Primary Examiner* — Christopher Wait

(74) *Attorney, Agent, or Firm* — Oblon, McClelland, Maier & Neustadt, L.L.P.

(57) ABSTRACT

A computer implemented method for embedding a marker in an image or video content including receiving an input image or frame for embedding, determining a binary message to be encoded within said input image or frame comprising bits sequences having an identical number of bits which is superior or equal to two, said binary message comprising at least a header part comprising at least two consecutive bits sequences which are not identical, detecting a region within said input image or frame such that the color within said region is uniform and that said region presents a chosen length and height, associating each possible bits sequence to a corresponding encoding color determined from the color within said uniform region and an encoding rule such that the respective colors are all different from one another, and generating a marker color table in which each element stores an encoding color associated to a bits sequence of the binary message, such that the color table constitutes a color encoding of the binary message, and embedding said marker in said region by appending directionally pixel blocks comprising at least a chosen number of pixels in an appending direction, the pixels within a given pixel block being each colored with the encoding color of an element of the marker color table, each element of the marker color table being associated with at least one pixel block.

14 Claims, 2 Drawing Sheets

(56) References Cited

U.S. PATENT DOCUMENTS

2012/0281871 A1 11/2012 Reed et al.
2019/0261012 A1* 8/2019 Hoarty ................. H04N 19/467
2020/0228675 A1 7/2020 Chadwick et al.

OTHER PUBLICATIONS

De Vleeschouwer, C., et al., "Invisibility and Application Functionalities in Perceptual Watermarking—An Overview", Proceedings of the IEEE, vol. 90, No. 1, XP001157370, 2002, pp. 64-77.
Akhtarkavan, E., et al., "Fragile high capacity data hiding in digital images using integer-to-integer DWT and lattice vector quantization", Multimedia Tools and Applications, vol. 79, No. 19-20, XP037144725, 2020, pp. 13427-13447.

* cited by examiner

COMPUTER IMPLEMENTED METHOD FOR EMBEDDING A MARKER IN AN IMAGE OR VIDEO CONTENT AND CORRESPONDING MARKER DETECTION METHOD

CROSS-REFERENCE TO RELATED APPLICATIONS

This application claims priority under 35 U.S.C. § 119 or 365 to European Application No. 21306480.1, filed Oct. 25, 2021. The entire contents of the above application are incorporated herein by reference.

BACKGROUND

Field

The disclosure concerns the field of computer vision.

Description of the Related Art

There are contexts in which a given content has a specific structure that is not always accessible or for which it may not always be desirable to use the tools available to access this specific structure.

This is for example the case with some Web applications involving screen sharing via image or streaming, which require using specific modules which cause problems associated with security requirements and/or user preferences to not rely on third party components.

There is thus a need to be able to detect specific portions of an image or a video content without resorting to existing methods or APIs ("Application Programming Interface"). API is a type of software interface, offering a service to other pieces of software. Marking is a known method to resolve this issue. Marking may be defined as using a marker covertly embedded in a noise-tolerant signal such as audio, video or image data. This is all the more complicated as the marking method needs to be robust to highly lossy compression of the media being marked and be fast to detect in order to be easily used.

Techniques such as encoding information in the least significant bits of the color information pixel-by-pixel cannot be used due to loss due to compression. There are two types of approaches that allow lossy compression to be taken into account:

Compression-aware solutions: These attempt to find safe spots in compression algorithms and exploit these to hide information in the compressed medium in a retrievable way, and Feature-aware solutions: These encode a message that went through a generic error correction code by altering the features of the source image.

Obviously, the former solutions cannot be used for the purpose of the disclosure, as there are as many compression algorithms and variants used as there are implementations.

The article by Sun, Shuliang. (2018) "*Image Steganography Based on Hamming Code and Edge Detection*" International Arab Journal of Information Technology, 15, 2018 describes how to perform steganography by modifying detected edge pixels within an image. This requires having control over these edges in the document, especially when used to embed third party content, which is a very stringent requirement. More generally, feature-aware steganography methods always assume full control over the visual appearance of the medium receiving the hidden piece of information, which is also a very stringent requirement.

BRIEF SUMMARY

In view of the above, there is currently no existing satisfying solution which provides a compression resistant steganography technique offering a computing time friendly detection method.

The disclosure aims at improving the situation. To this end, described is a computer-implemented method for embedding a marker in an image or video content comprising the following operations:

a) receiving an input image or frame for embedding, b) determining a binary message to be encoded within said input image or frame comprising bits sequences having an identical number of bits which is superior or equal to two, said binary message comprising at least a header part comprising at least two consecutive bits sequences which are not identical, c) detecting a region within said input image or frame such that the color within said region is uniform and that said region presents a chosen length and height, d) associating each possible bits sequence to a corresponding encoding color determined from the color within said uniform region and an encoding rule such that the respective colors are all different from one another, and e) generating a marker color table in which each element stores an encoding color associated to bits sequence of the binary message, such that the color table constitutes a color encoding of the binary message, and f) embedding said marker in said region by appending directionally pixel blocks comprising at least a chosen number of pixels in an appending direction, the pixels within a given pixel block being each colored with the encoding color of an element of the marker color table, each element of the marker color table being associated with at least one pixel block.

This method is advantageous because it allows for a marker to be embedded, which can be detected with detection method having a linear complexity and is resistant to lossy compression.

In various embodiments, this method may present one or more of the following features:

operation e) comprises using a horizontal appending direction, a number of four pixels in the appending direction, and further creating pixel blocks having a square shape, operation e) further comprises repeating each pixel block of the header part a chosen number of times before appending the next pixel block, the header part comprises bit sequences which are arranged such that each bit sequence is different from its immediate neighbors, such that each combination of two neighboring bit sequences is unique in the header part, and the binary message comprises a header part and a payload part comprising at least two bits sequences, wherein operation b) comprises applying an error correction code to the payload part to obtain a robust payload part, and interlacing the robust payload part.

The disclosure further concerns a computer implemented method for detecting a marker embedded in an image or video content according to the method of one of the preceding claims comprising the following operations:

a) receiving an input image or frame for detection,
b) parsing the input image or frame by groups of pixels aligned along an image parsing direction, the pixels of each pixel group being separated within the image in the image parsing direction by a number of pixels equal to the size of the pixel blocks, the groups of pixels having the size of the number of bit sequences in the header,
c) in each group of pixels, detecting the color of each pixel, and matching said color with one of the encoding colors of a bits sequence,
d) comparing the resulting pairs of bit sequences to the pairs of bit sequences of the header part taking into account their positions and, upon detecting a chosen number of matching pairs of bit sequences, storing the position of the first pixel in the corresponding group of pixels as a potential marker starting position.

In various embodiments, this method may present one or more of the following features:
operation b), c) and d) are performed sequentially by parsing a number of groups of pixels equal to the chosen number of pixels in the appending direction in parallel,
the image parsing direction is horizontal,
the binary message encoded in the embedded marker further comprises a payload part, and wherein the method further comprises an operation e) of parsing the image according to the image parsing direction to retrieve all of the pixels corresponding to the pixel blocks of the payload part, of detecting the color of each pixel, and matching said color with one of the encoding colors of a bits sequence,
if operation e) fails to match a pixel to an encoding color, resume operations b) to d),
the said payload part has been encoded according to the above encoding method, the method further comprising an operation f) of decoding the bit sequences accordingly, and, if operation f) is successful, exploring the area around the potential marker starting position with a square window which side has a size equal to the chosen number of pixels in the appending direction, said window being centered on the potential marker starting position, and identifying the pixel which defines implicitly an image zone which best corresponds colorwise to marker originally embedded, and
if operation f) fails to decode the payload part, resume operations b) to d).

The disclosure also concerns a computer program comprising instructions for performing the methods according to the disclosure, a data storage medium having recorded thereon such a computer program and a computer system comprising a processor coupled to a memory, the memory having recorded thereon such a computer program.

BRIEF DESCRIPTION OF THE SEVERAL VIEWS OF THE DRAWINGS

Other features and advantages of the disclosure will readily appear in the following description of the drawings, which show exemplary embodiments of the disclosure and on which.

DETAILED DESCRIPTION

The drawings and the following description are comprised for the most part of positive and well-defined features. As a result, they are not only useful in understanding the disclosure, but they can also be used to contribute to its definition, should the need arise.

Figure 1:
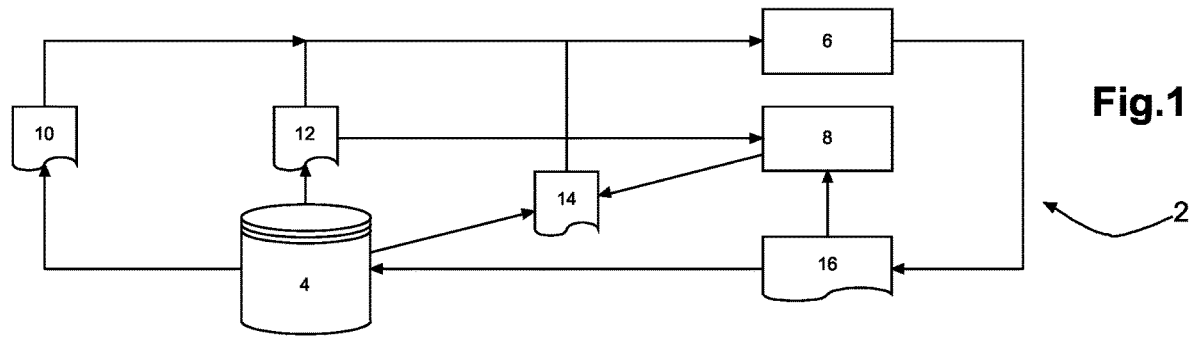
FIG. 1 shows a general diagram view of a system according to the embodiments.

FIG. 1 shows a general diagram view of a system according to the embodiments. The system 2 comprises a memory 4, an embedder 6 and a detector 8.

The memory 4 stores all of the data which is used in the system 2, whether lasting or temporary. It receives all the inputs and outputs. The main types of data which are stored in the memory 4 are image or video/streaming frame 10, embedding and encoding parameters 12, binary message 14 and marked images 16.

As will appear readily from the embodiments described herein, the system may be all and any type of computer, that is a personal computer, a laptop, a tablet, a mobile phone, etc. The images which are processed according to the disclosure may be displayed by way of a display connected to the system 2.

In the following, the expression "image" will be used to refer to any media or extraction of a media that is the subject of the system 2. More precisely, the system 2 treats images, but these images may come from files which are themselves images, in part or in whole, but they may also be frames of a video stream, whether recorded or live, or they may be sub-parts of another file, such as a DOM element within a frame.

In the example described herein, the memory 4 may be realized in any way suitable, that is by way of a hard disk drive, a solid-state drive, a flash memory, a memory embedded in a processor, a distant storage accessible in the cloud, or any other suitable mean.

Some of the data may be stored on memories separate from memory 4, which may itself be made of separate units. Some of the data may be dropped as necessary, and there is no requirement that all the data be stored in a single memory.

In the example described herein, the embedder 6 and the detector 8 are computer programs which are executed on one or more processors. Such processors include any means known for performing automated calculus, such as CPUs, GPUs, CPUs and/or GPUs grids, remote calculus grids, specifically configured FPGAs, specifically configured ASICs, specialized chips such as SOCs or NOCs, AI specialized chips, etc.

The embedder 6 is arranged to receive an input image 10, embedding and encoding parameters 12 and a binary message 14 to be encoded and embedded. Embedder 6 processes this data and returns a marked image 16 which may be stored in the memory 4 or sent to another party.

Conversely, detector 8 receives a presumably marked image 16 as well as the embedding and encoding parameters 12. Detector 8 processes this data and returns a binary message 14 or another type of related information.

Figure 2:
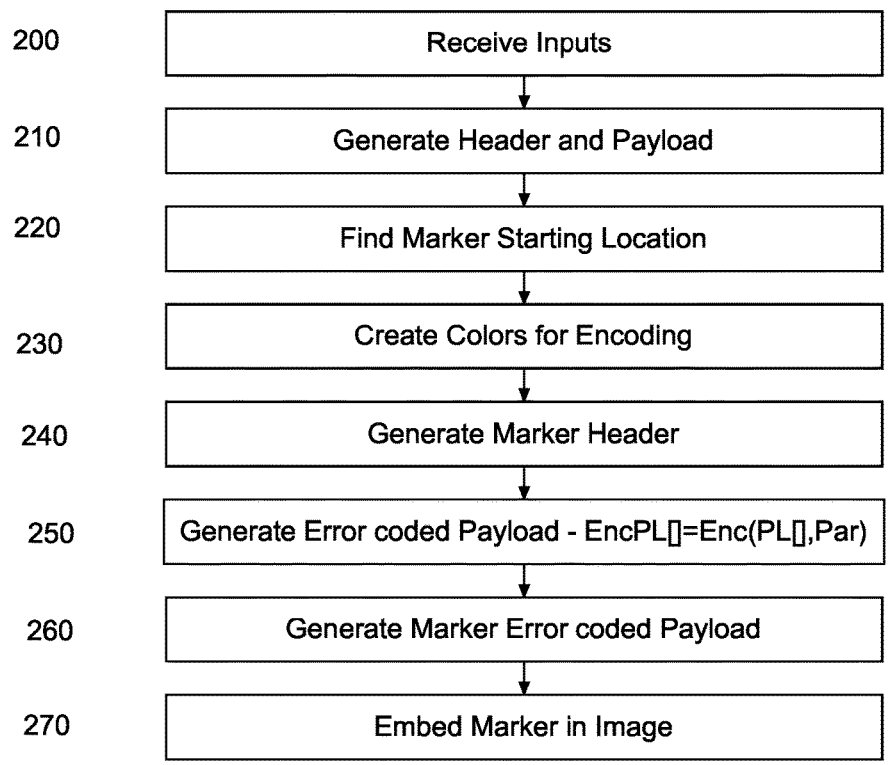
FIG. 2 shows an exemplary embodiment of a marker embedding function executed by the embedder of FIG. 1.

FIG. 2 shows an exemplary embodiment of a function performed by the embedder 6.

This function starts with a variable input operation 200 in which the inputs of the function of FIG. 2 are received. This may be performed by way of a function Inp( ) n which an input image Img, marker generation parameters Par and a message BinMsg are provided as arguments which will be used as global variables.

This can be done by way of a human machine interface (HMI). Any type of HMI can be used as long as it offers an interface through which a user designates or otherwise uploads a file containing these global variables or designates entries in the memory 4. For example, this can be done by pointing out a specific zone of a display of a videoconferencing application, whether using a mouse or a keyboard. This can also be done automatically.

Operation 200 is followed by a message components determination operation 210, in which the header and the payload of the marker to be embedded in the image are determined. This may be done by means of a function Prepare( ) which receives the message BinMsg and the parameters Par as arguments, and returns a pair of vectors Header[ ] and Payload[ ].

In the example described herein, the vector Header[ ] contains the binary header of the marker to be embedded and is always the same. It may be contained in the parameters Par, hardcoded in function Prepare( ) or determined otherwise. Alternatively, vector Header[ ], and may be built according to the parameters Par or extracted from the message BinMsg.

Vector Payload[ ] is the payload of the message BinMsg and contains information that is intended to be transmitted in the marker. In one embodiment, the payload may contain information with regards to a DOM object which is intended to be shared. In another embodiment, the payload may contain identifiers concerning the image which is being marked. In yet another embodiment, the payload may be used for tracking purposes. In some embodiments, vector Payload[ ] may be omitted.

Header[ ]Payload[ ] vector Payload[ ] has a size that is fixed according to parameters Par, or is fixed implicitly. If the message BinMsg has a size inferior to that of vector Payload[ ], then vector Payload[ ] may be 0 padded. In another alternative embodiment, function Prepare( ) also performs the operation of operation 250 described further below, and the vector Payload[ ] contains an encoded version of the payload.

Operation 210 is followed by marker starting location determination operation 220. This may be done by means of a function Locate( ) which receives the image Img and the parameters Par as arguments and return a marker starting point StartPoint and a reference color RefColor. In an alternative embodiment, operation 220 can be performed before operation 210, or they can be performed in parallel.

Function Locate( ) of operation 220 is used to detect in image Img an area where the marker may be stored. As will appear further below, the disclosure allows for storing markers that may be inconspicuous, and in that way relates to steganography. The size of the marker itself is dictated by the parameters Par, and it takes the general form of a line of pixels which have varying colors encoding information where the original image had uniform or very homogeneous colors. In the case of an inconspicuous marker, the color variations are chosen such that they are not easily distinguished by a person seeing the content. In order to embed such marker, it is thus necessary to find an area of the image Img which is sufficiently homogeneous or uniform color wise to encompass the marker size.

The result of function Locate( ) of operation 220 comprises the coordinates of the left most point of the first area within image Img which has a uniform color RefColor and which is big enough to contain the marker generated by the embedder 6. The size of the marker is known in advance as it derives from the parameters Par.

Figure 3:
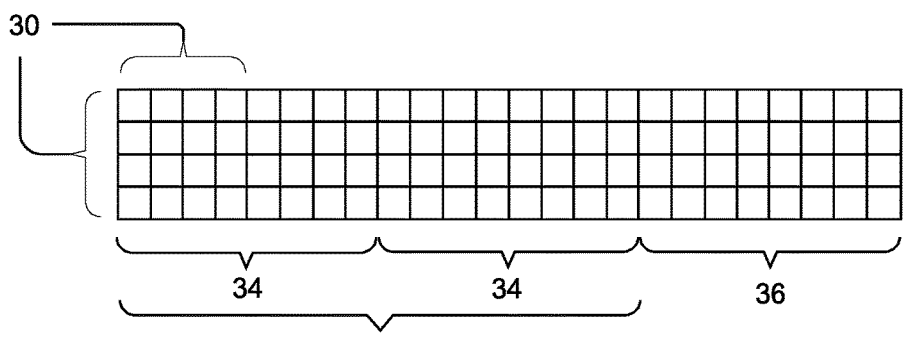
FIG. 3 shows a schematic example of a marker produced with the function of FIG. 2.

In the example shown in FIG. 3, the marker is made of pixel blocks 30 each having a square shape made of four by four-pixels. This allows to counter the effects of high-frequency information discarding and be resilient to all types of compressions. Indeed, even if the compression algorithm alters the edge pixels of the pixel blocks, the central area will remain relatively unaffected. As a result, the square shape may be considered as defining sacrificial pixels (the outer edges of the pixel blocks), thereby ensuring algorithm agnosticism and algorithm related compression artifacts resilience. More generally, the pixel blocks 30 can be rectangular or square-shaped, as long as both dimensions are equal to three or more.

In the header part 32, the pixel blocks are repeated twice as blocks 34, which allows for the header part of the marker to be detected even if there is a mouse pointer on top of it, as well as in the case of external visual artifacts. The message part 36 is made of single pixel blocks which have the same size as the pixel blocks of header part 32.

The logic behind this difference is that it is critical to be able to detect the header part of the marker, which is meant to be shorter as it does not carry meaningful information. For this reason, repeating the pixel blocks is a good manner to provide resiliency in a context where error coding is not available due to the lack of a priori knowledge of the presence and exact location of the header. On the opposite, the payload part of the marker is usually meant to be longer than the header part, and may undergo error coding as will appear below, which is more optimal than to duplicate the pixel blocks. In some embodiments, the header may be made arbitrarily long, and the payload may be chosen arbitrarily short.

In various embodiments, the size of the pixel blocks and their shapes may vary, and may even be different from one another. Also, the pixel blocks of the message part may also be repeated twice or more.

Operation 220 is followed by a color encoding determination operation 230 in which a function ColorMix( ) receives the reference color RefColor determined in operation 220 as well as the parameters Par and determines a set of colors which will be returned in a table EncodingColorBitSequences[ ] as a result, and will be used to color the pixel blocks of the marker. The table EncodingColorBitSequences[ ] may be bidimensional and store both the bits sequences and the corresponding encoding color, or it may be monodimensional, with the bits sequences being implicit.

As discussed earlier, the parameters Par include the bits sequence size, which dictates how many different colors are needed to encode the different bits sequences. For example, for a bit sequence size of 2, the possible bits sequences are 00, 01, 10 and 11, meaning four colors are needed to encode the different bits sequences based on the reference color RefColor. In the bits sequence size is 3, then 8 colors are needed. In general, $2^n$ colors will be needed to encode bits sequences of size n.

The Applicant has found that using a bit sequence size equal to 2 is advantageous because it decreases the number of color needed to encode the bits sequences (a bigger bits sequence size means a pixel block encodes more bits, but it also means that it is harder to keep the marker inconspicuous as there are more different colors).

There are many methods that can be used to associate a set of colors to the bits sequences. One of these methods is to take the RGB (Red Green Blue, which is how colors are computed in most computer applications in general, and in web applications in particular) values of the reference color RefColor and to modify the R and/or B channels. One of the reasons for not altering the G channel is that the human eyes is particularly sensitive to green, and not modifying the G channel allows for a more inconspicuous marker, for example for steganography applications. Alternatively, all channels may be altered. For example, a fixed value may be added or deducted to perform the encoding: +3 or −3 to either the R or the B channel, or both. In order to promote inconspicuousness, the trade-off to be made is to ensure the smallest absolute fixed value while ensuring good robustness at decoding time. The value 3 has shown excellent results in that regards. The Applicant has discovered that a value up to 6 may be retained with good inconspicuousness results, compatible with steganography applications.

The Applicant has also discovered that it is advantageous to add a value if the channel value of the reference color is inferior to 128, and to deduct the value otherwise. Indeed, this allows to use any reference color RefCol value, no matter what the fixed value being used. In an alternative embodiment, operation 220 may be modified to refuse a starting point which is incompatible with the fixed value, that is if it is too close to the limits of the RGB extrema. For example, with a fixed value of +3 or −3, operation 220 may reject a starting point which has a color channel R, G or B which may be modified and which is smaller than 3 or higher than 252. Of course, another value than 3 may be used. Furthermore, two different boundary values can be used.

This means that, for a reference color having RGB values (130, 64, 127), the encoding may be Bits sequence 00: (130, 64, 127)
Bits sequence 01: (130, 64, 130)
Bits sequence 10: (127, 64, 127)
Bits sequence 11: (127, 64, 130)

Alternatively, the value may be different than 3, and it may be different for addition and deduction, it may be only addition or only deduction, etc.

The Applicant has also discovered that it is advantageous to assign the colors to the bits sequence in a way that minimizes the Hamming distance between colors that are more likely to be mistaken for one another. Indeed, the Hamming distance is the default distance when comparing strings (especially strings of bits), and it is consistent with the use of the Hamming correction explained below, whose error correction abilities depend on the Hamming distance of the encoded and decoded message.

For clarity's sake, it is reminded that the Hamming distance between two strings of equal length is the number of positions at which the corresponding symbols are different. In other words, it measures the minimum number of substitutions required to change one string into the other, or the minimum number of errors that could have transformed one string into the other.

This is done by optimizing the sums of the differences between the Manhattan RGB distance between the colors and the Hamming distance between the corresponding bits sequences. This is similar to minimizing the following equation:

$$\sigma = \sqrt{\sum_{\substack{A \in \$COLORS, \\ B \in \$COLORS, \\ A \neq B}} (d_{Manhattan}(A_{RGB}, B_{RGB}) - d_{Hamming}(A_{bits}, B_{bits}))^2}$$

Where $A_{RGB}$ and $B_{RGB}$ designate colors derived from reference color RefCol value, and $A_{bits}$ and $B_{bits}$ designate the bits sequence which may be associated to colors $A_{RGB}$ and $B_{RGB}$ in the resulting table EncodingColorBitSequences[ ]

For clarity's sake, it is reminded that the Manhattan RGB distance between two colors is the sum of the distances for each respective RGB channel of these colors, that is for two colors C1 and C2 |R(C1)−R(C2)|+|G(C1)−G(C2)|+|B(C1)−B(C2)|.

This assignment can be calculated by function ColorMix( ) or it may be precomputed in a look-up table for performance purposes.

Once the header, the payload and the encoding colors have been determined, the marker may be generated. This is done by three operations 240, 250 and 260. Operations 240 and 250 together with 260 may be performed sequentially or in parallel.

Marker header generation operation 240 executes a function MarkerHeader( ) which receives the vector Header[ ], the table EncodingColorBitSequences[ ] and the parameters Par, and returns a marker header table MarkerHeader[ ] which contains the colors for the pixel blocks encoding the marker header.

As described above, the parameters Par contain the pixel blocks size and shape, as well as the redundancy parameter of the marker header pixel blocks. The marker header table MrkHeader[ ] may designate the pixels implicitly, starting from the leftmost pixel, with the pixels in a given line being progressively to the right, and the pixels in a below line being progressively lower.

Payload encoding operation 250 executes a function Encode( ) which receives the payload vector Payload[ ] and the parameters Par as arguments and returns a vector ErrorCodedPayload[ ] of bits sequences corresponding to the encoded payload. The goal of this encoding is primarily to make the payload more robust to highly lossy encoding. In order to do so, the Applicant has discovered that it is advantageous to use the vector Payload[ ] and to encode it with a Hamming error code, here Hamming(8,4). For example, this means that a vector Payload[ ] for the payload 1100 0101 will be encoded as 01111000 01001011.

The advantage of using the Hamming (8;4) error code is that it provides an additional parity bit allowing for detection of one additional error to the optimal Hamming (7;4) error code, and also the length of its output is a multiple of the length of the input, which removes the need for padding. Other error codes than the Hamming error code may be used.

Thereafter, the Encode( ) further interlaces the result, in order to spread possible bursts of errors to different Hamming chunks. Other error codes than the Hamming error code may be used, and the interlacing may be optional.

This means that the Hamming encoded payload is cut into blocks of size 8 (the size of the Hamming blocks), and those blocks are intertwined like two combs (the first bit of the first block is followed by the first bit of the second block, etc. until the first bit of the last block, then the second bit of the first block is followed by the second bit of the second block, etc.): 01111000 01001011 becomes 00111010 11000101.

Finally, function Encode( ) stores the result as bits sequences in the vector ErrorCodedPayload[ ]. Incidentally, when the bits sequence size is equal to two, the bits sequencing can be done at the same time as the interlacing, which allows to execute function Encode( ) faster. As explained above, operation 250 may be performed at the same time as operation 210.

Marker error coded payload generation operation 260 executes a function MarkerPayload[ ] which receives vector ErrorCodedPayload[ ], table EncodingColorBitSequences[ ] and parameters Par as arguments and returns a marker payload table MarkerPayload[ ] which contains the colors for the pixel blocks encoding the marker payload.

Function MarkerPayload[ ] is extremely similar to function MarkerHeader( ), except that the rules for generating the pixel blocks are likely to be different for the payload, as explained above.

Finally, once the marker header and the marker payload have been generated, the embedder 6 finishes its function in an image marking operation 270 which executes a function Embed( ) which receives marker header table MarkerHeader[ ], marker payload table MarkerPayload[ ], starting point StartPoint and image Img as arguments and returns a marker embedded image EmbeddedImg. Function Embed( ) simply starts from starting point StartPoint in image Img and replaces the pixels following starting point StartPoint with pixels colored according to marker header table MarkerHeader[ ], marker payload table MarkerPayload[ ].

The result is an image which has an inconspicuous marker due to the choice of encoding colors, and which is highly resistant to lossy compression. In the Web context described above, this allows to designate objects or sub-objects without having to resort to any outside library or using JavaScript of another security-risking add-on. As described above, in some embodiments, the marker may be reduced to the header only, especially if the marker can be placed in a region of interest.

Figure 4:
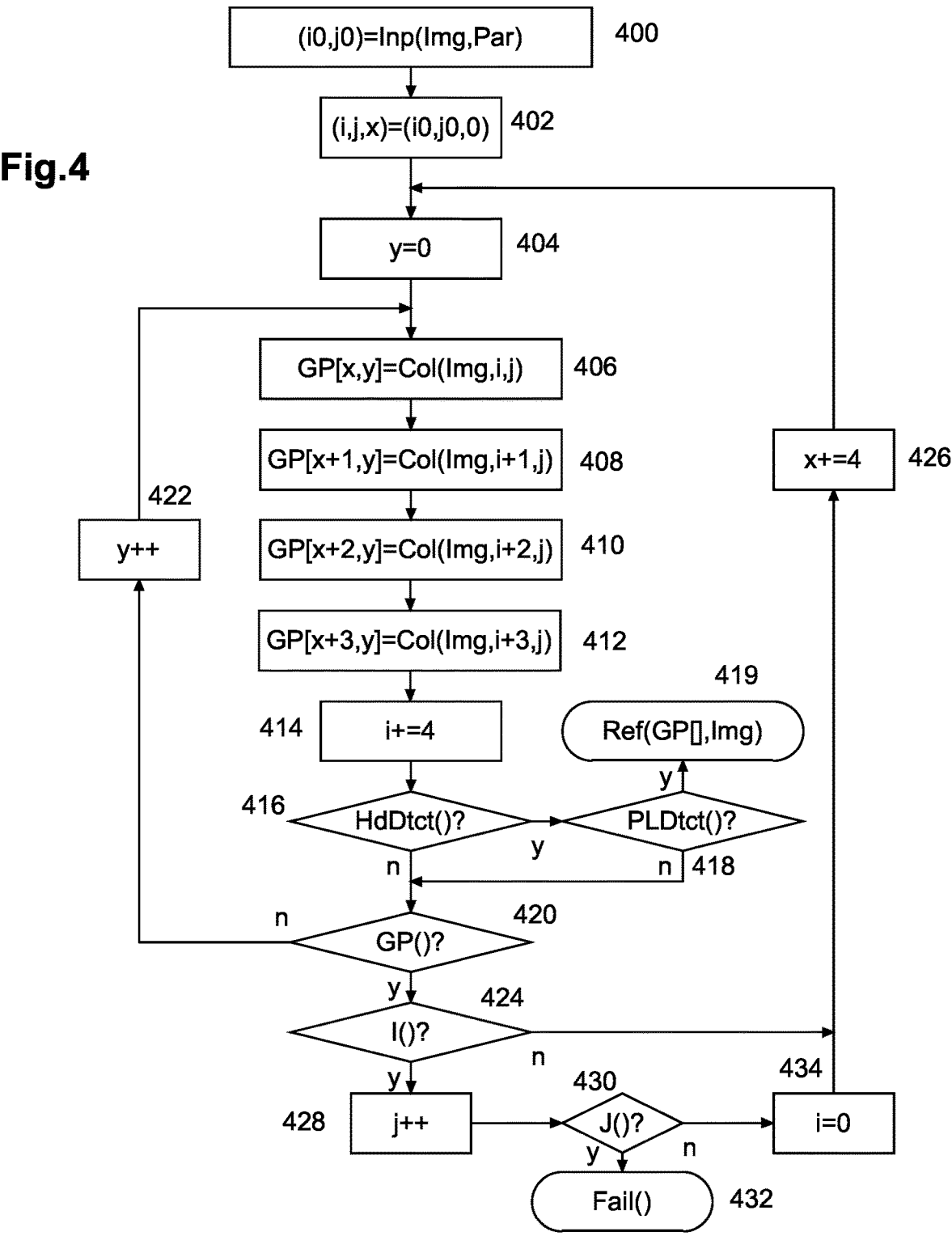
FIG. 4 shows an exemplary embodiment of a marker detection function executed by the detector of FIG. 1.

FIG. 4 shows an exemplary embodiment of a function performed by the detector 8.

As will be shown below, detector 8 is able to determine whether an input image contains a marker introduced by the embedder 6. In the Web context described above, the image sharing device will use the embedder 6 upstream of the streaming, and the receiving devices will use the detector downstream of the streaming.

As will appear below, the detector 8 may return the payload message, or it may return another information which is relevant to the use of the embedded image.

The function of FIG. 4 comprises several loops, which are meant to perform as follows:
 the image is parsed horizontally, advantageously by treating a number of pixels which is equal to the size of the pixel block side. Therefore, any given loop can only detect at most one information-bearing pixel per pixel block and per line, making it possible to translate color to information on a pixel-by-pixel basis with high redundancy, to benefit fully from the robustness of the pixel block design,
 the color transitions are compared to the bits sequence transitions of the header in order to try and detect the header as quick as possible. As soon as a chosen number of correctly placed bits sequences are identified, the image parsing is stopped to try and decode the payload,
 if there is no information to infer the correct content of the payload, then the payload color decoding is performed very strictly, and any error in the payload pixel block color detection causes the decoding attempt to fail, in order to promote decoding failure over wrong message decoding,
 if the right end of the image is encountered, or the known size of the header has been parsed, then new pixel groups are generated until the header is considered as detected or all of the pixels of the image have been parsed unsuccessfully.

This function starts with an input operation 400 in which a function Inp( ) which receives as arguments an input image Img (in the example shown in FIG. 1 the result of embedder 6, image EmbImg, is used), and the parameters Par.

This can be done by means of a human machine interface (HMI). Any type of HMI can be used as long as it offers an interface through which a user designates or otherwise uploads a file containing these global variables or designates entries in the memory 4. For example, this can be done by pointing out a specific zone of a display of a videoconferencing application, whether using a mouse or a keyboard. This can also be done automatically.

Input operation 400 returns an image parsing starting point designated by its coordinates in the image (i0,j0). Typically, i0 and j0 will be equal to 0 (meaning starting with the top left corner of the image). However, the parameters Par may indicate differently.

Operation 400 is followed by an index initialization operation 402 in which the local variables i, j and x will be initiated. Indexes i and j will be used to retrieve the pixel colors in the image, while x will identify the different pixels groups which the function is trying to identify with the marker header.

After operation 402, the groups of pixels color retrieval loop begins with a pixel group parsing position reset operation 404 in which a local variable y is initiated at 0. The variable y will indicate the position of the pixel being parsed within each group of pixels.

Consequently, after operation 404, four operations 406, 408, 410 and 412 are executed in sequence or in parallel, in which four groups of pixels of increasing x index are filled in their position y by means of a function Col( ) which receives the input image Img, an increasing value of index i, and index j as arguments, and returns a color in the table of groups of pixel GP[ ].

Since the input Img has likely undergone a highly lossy compression prior to being received by the detector 8, there is a high chance that the color of the pixels it contains do not match the colors of the table EncodingColorBitSequences[ ]. As a result, function Col( ) tries to determine which of the colors in table EncodingColorBitSequences[ ] is the closest to the color of a given pixel.

This distance may be based on the Manhattan RGB distance, within a tolerance threshold. Using 0 as a tolerance value will obviously cause false negatives, but the Applicant has discovered that the tolerance threshold should be no higher than the minimum color distance between the closest elements of table EncodingColorBitSequences[ ]: too high a tolerance threshold will cause completely unrelated colors to be interpreted as corresponding to EncodingColorBitSequences[ ] colors, leading to false positive marker header detection. The Applicant has discovered that a reasonable empirical value is half the minimum color distance between the closest elements of table EncodingColorBitSequences[ ], e.g., [½×d(RGB(±0, ±0, ±0), RGB(±0, ±0, ±3))]=2. If the function Col( ) cannot associate a color from table EncodingColorBitSequences[ ], with the parsed pixel, then the table element GP[x,y] is left void or filled with a value indicating failure of correspondence.

When looking at operations 406 to 412, it appears that this loops fills the table GP[ ] as a horizontally sliding window on the image Img. Consequently, operation 412 is followed by operation 414 where index i is incremented by four, in order to parse the next four horizontal pixels of image Img. Where the header pixel blocks are repeated during the embedding process, index i may be increased by 8 or another multiple of four. This process and the horizontal nature of the marker allows to take advantage of speculative caching in CPUs, which, based on a given pixel of a given line fill the cache with the remainder of that image line (as images are stored in memory pixel by pixel, from left to right then top to bottom). The parsing could be done differently, at the cost of reduced efficiency.

Operation 414 is followed by a header detection operation 416, which determines whether one of the groups of pixels contains a sequence of colors which corresponds to the marker header. In order to do so, a function HdDtct( ) is executed in operation 416, and compares the color transitions indicated in the groups of pixels GP[x] to the color transitions expected from the marker header. Once a chosen number of exactly corresponding transitions at their expected spot in the header are found, for instance two out of three, it is considered that a marker header has potentially been identified in image Img.

In this case, operation 416 is followed by a payload detection operation 418 in which a function PLDtct( ) is executed. This function parses all the pixels horizontally following the alleged marker header up to the marker payload length. Each pixel is treated by a function Color( ) to determine whether it is associated with a color in table EncodingColorBitSequences[ ], and function PLDtct( ) thereafter tries to perform a decoding of the resulting payload. This is done by first de-interlacing the bits sequences corresponding to the detected colors, and then by Hamming decoding (or the decoding function for the error code used by the embedder 6) the resulting message. Of course, if no interlacing and/or no error coding were used, the de-interlacing and decoding are not performed. If there is no information to infer the correct content of the payload, then the payload color decoding in function PLDtct( ) is performed very strictly. Any error in the payload pixel block color detection will causes function PLDtct( ) to return a negative result, in order to promote decoding failure over wrong message decoding.

If the decoding is successful, then it is considered that a marker header has been successfully identified. Operation 418 is thus followed by an optional operation 419 in which a function Ref( ) which receives the table GP[ ] and the image Img as variables, and returns a definite marker header leftmost position.

Function Ref( ) has the role of exploring the pixels around the left most pixel of the group of pixels which led to the successful detection of the marker header, and see if there is a better starting parsing point. To this end, function Ref recovers all of the pixels based on a starting point in a window having the left most pixel of the group of pixels which led to the successful detection of the marker header as its upper left corner, and having a side with the size of the pixel block side. Thereafter, function Ref( ) calculates, for each resulting candidate marker header, the sum of the Manhattan RGB distances between the pixel of the candidate marker header and the color values of the marker header as embedded. Advantageously, these Manhattan RGB distances are bound by the maximum Manhattan RGB distance between all encoding colors in order to take into account the case where the marker header is at least partially hidden (for example by the mouse cursor, which would generate abnormally high Manhattan RGB values). The calculus by function Ref( ) can be seen as the optimization of the following formula $$\Delta(x, y) = \sum_{i=0}^{M_W} \sum_{j=0}^{M_H} \min(maxdist, d_{Manhattan}(M_{i,j} I_{x+i, y+j}))$$

Where $\Delta(x, y)$ is the value to be optimized, $M_W$ and $M_H$ represent the width and height of the marker—with exact speck colors—reconstructed from the decoded payload, I is the explored region, and maxdist is the Manhattan RGB distance between the two most distant colors of the table EncodingColorBitSequences[ ].

Thereafter, function Ref( ) returns the best candidate, that is the starting point for which the sum of the Manhattan RGB distances is the smallest. The detection thereafter ends with the return of the starting point and/or of the decoded payload. Other functions than the Manhattan RGB distance may be used, but it constitutes the best combination with the use of Hamming error coding according to the Applicant's explorations.

If either of functions HdDtct( ) or PLDtct( ) returns a negative value, then it means that the next groups of pixels have to be parsed and tested. First, an operation 420 executes a function GPO which tests whether the current loop has filled the groups of pixels to the length of the marker header. If it isn't the case, then index y is incremented in an operation 422 and the loop resumes with operations 406 to 412.

If the groups of pixels have been filled, then these candidates are not valid, and an operation 424 executes a function I( ) to determine whether the right end of the image Img has been reached. If it is not the case, then new groups are filled by incrementing index x is by four in an operation 426, resetting the index y to 0 in operation 404, and restarting the loop with the new groups of pixels.

If the right end of the image Img has been reached, then index j is incremented in an operation 428 to parse the next line of image Img, and a function J( ) is executed in an operation 430 to determine whether the bottom right corner of the image Img has been reached. If it is the case, then no marker header has been found, and the function ends in operation 432. If it is not the case, then index i is reset to 0 in an operation 434 and index x is incremented by four in operation 426, and the new groups are filled by resetting the index y to 0 in operation 404 and restarting the loop with the new groups of pixels.

It appears that the embedding in a horizontal manner is particularly advantageous because it allows to leverage the speculative caching of processors, which will fill the buffer horizontally.

An example of use of the above described disclosure is associated with the sharing of one's screen or window. Conventionally, the Web browser does not offer the possibility to detect a DOM (Document Object Model) element within a frame of a getDisplayMedia stream so as to obtain a screenshot targeted to this element without the use of html2canvas (which is a method used to make screenshots with JavaScript). For better understanding, getDisplayMedia( ) is a method of the MediaDevices interface which prompts a user to select and grant permission to capture the contents of a display or portion thereof—such as a window—as a MediaStream, the resulting stream be recordable using the MediaStream Recording API or transmittable as part of a WebRTC session. The disclosure allows for offering an easy sharing of the screen or part of a window without having to use these conventional means.

The above is only meant as an example of use of the disclosure and shall not be used to restrict its scope as there are many other settings in which it may be used.

The invention claimed is:

1. A computer implemented method for embedding a marker in an image or video content comprising:
   a) receiving an input image or frame for embedding;
   b) determining a binary message to be encoded within said input image or frame including bit sequences having an identical number of bits which are superior or equal to two, said binary message including at least a header part having at least two consecutive bit sequences which are not identical;
   c) detecting a region within said input image or frame such that a color within said region is uniform and that said region presents a chosen length and height;
   d) associating each possible bit sequence to a corresponding encoding color determined from the color within a uniform region and an encoding rule such that respective colors are all different from one another;
   e) generating a marker color table in which each element stores an encoding color associated to a bit sequence of the binary message, such that the color table constitutes a color encoding of the binary message; and
   f) embedding said marker in said region by appending directionally pixel blocks having at least a chosen number of pixels in an appending direction, the pixels within a given pixel block being each colored with the encoding color of an element of the marker color table, each element of the marker color table being associated with at least one pixel block.

2. The computer implemented method according to claim 1, wherein step e) further comprises using a horizontal appending direction, a number of four pixels in the appending direction, and further creating pixel blocks having a square shape.

3. The computer implemented method according to claim 1, wherein step e) further comprises repeating each pixel block of the header part a chosen number of times before appending a next pixel block.

4. The computer implemented method according to claim 1, wherein the header part includes bit sequences which are arranged such that each bit sequence is different from immediate neighbors of the bit sequence, such that each combination of two neighboring bit sequences is unique in the header part.

5. The computer implemented method according to claim 1, wherein the binary message includes a header part and a payload part having at least two bit sequences, wherein step b) further includes applying an error correction code to the payload part to obtain a robust payload part, and interlacing the robust payload part.

6. The computer implemented method for detecting a marker embedded in an image or video content according to claim 1, wherein the method further comprises:
   g) receiving an input image or frame for detection;
   h) parsing the input image or frame by groups of pixels aligned along an image parsing direction, pixels of each pixel group being separated within the image in the image parsing direction by a number of pixels equal to a size of pixel blocks, groups of pixels having a size of a number of bit sequences in the header part;
   i) in each group of pixels, detecting a color of each pixel, and matching said color with one of encoding colors of a bit sequence; and
   j) comparing resulting pairs of bit sequences to pairs of bit sequences of the header part taking into account their positions and, upon detecting a chosen number of matching pairs of bit sequences, storing a position of a first pixel in a corresponding group of pixels as a potential marker starting position.

7. The computer implemented method according to claim 6, wherein steps b), c) and d) are performed sequentially by parsing a number of groups of pixels equal to a chosen number of pixels in the appending direction in parallel.

8. The computer implemented method according to claim 6, wherein the image parsing direction is horizontal.

9. The computer implemented method according to claim 6, wherein the binary message encoded in the embedded marker further includes a payload part, and wherein the method further comprises k) parsing the image according to the image parsing direction to retrieve all of the pixels corresponding to pixel blocks of the payload part, l) detecting the color of each pixel, and m) matching said color with one of the encoding colors of a bit sequence.

10. The computer implemented method according to claim 9, wherein when the parsing in step k) fails to match a pixel to an encoding color, the method further comprises resuming steps h), i) and j).

11. The computer implemented method according to claim 9, wherein said payload part has been encoded by applying an error correction code to the payload part to obtain a robust payload part, and interlacing the robust payload part, and wherein the method further comprises n) decoding bit sequences accordingly, and, when step n) is successful, o) exploring an area around the potential marker starting position with a square window which side has a size equal to a chosen number of pixels in the appending direction, said window being centered on the potential marker starting position, and p) identifying a pixel which defines implicitly an image zone which best corresponds colorwise to marker originally embedded.

12. The computer implemented method according to claim 11, wherein when operation n) fails to decode the payload part, resume steps h), i) and j).

13. A non-transitory computer readable storage medium having recorded thereon a computer program that when executed by a computer causes the computer to implement a method for embedding a marker in an image or video content comprising:
   a) receiving an input image or frame for embedding;
   b) determining a binary message to be encoded within said input image or frame including bit sequences having an identical number of bits which are superior or equal to two, said binary message including at least a header part having at least two consecutive bit sequences which are not identical;
   c) detecting a region within said input image or frame such that a color within said region is uniform and that said region presents a chosen length and height;
   d) associating each possible bit sequence to a corresponding encoding color determined from the color within a uniform region and an encoding rule such that respective colors are all different from one another;
   e) generating a marker color table in which each element stores an encoding color associated to a bit sequence of the binary message, such that the color table constitutes a color encoding of the binary message; and
   f) embedding said marker in said region by appending directionally pixel blocks having at least a chosen number of pixels in an appending direction, the pixels within a given pixel block being each colored with the encoding color of an element of the marker color table, each element of the marker color table being associated with at least one pixel block.

14. A computer system comprising:
   a processor coupled to a memory, the memory having recorded thereon a computer program that when executed by the processor causes the processor to implement embedding of a marker in an image or video content by being configured to:
   a) receive an input image or frame for embedding,
   b) determine a binary message to be encoded within said input image or frame including bit sequences having an identical number of bits which are superior or equal to two, said binary message including at least a header part having at least two consecutive bit sequences which are not identical, c) detect a region within said input image or frame such that a color within said region is uniform and that said region presents a chosen length and height, d) associate each possible bit sequence to a corresponding encoding color determined from the color within a uniform region and an encoding rule such that the respective colors are all different from one another, e) generate a marker color table in which each element stores an encoding color associated to a bit sequence of the binary message, such that the color table constitutes a color encoding of the binary message, and f) embed said marker in said region by appending directionally pixel blocks having at least a chosen number of pixels in an appending direction, the pixels within a given pixel block being each colored with the encoding color of an element of the marker color table, each element of the marker color table being associated with at least one pixel block.

* * * * *